United States Patent
Durrett et al.

(10) Patent No.: US 10,502,130 B2
(45) Date of Patent: Dec. 10, 2019

(54) COMPOSITE THERMAL BARRIER COATING

(71) Applicant: GM GLOBAL TECHNOLOGY OPERATIONS LLC, Detroit, MI (US)

(72) Inventors: Russell P. Durrett, Bloomfield Hills, MI (US); Paul M. Najt, Bloomfield Hills, MI (US); Peter P. Andruskiewicz, IV, Ann Arbor, MI (US); Jason R. Traub, Clinton Township, MI (US); Michael J. Walker, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 15/433,285

(22) Filed: Feb. 15, 2017

(65) Prior Publication Data
US 2017/0234216 A1 Aug. 17, 2017

Related U.S. Application Data

(60) Provisional application No. 62/312,882, filed on Mar. 24, 2016, provisional application No. 62/296,354, filed on Feb. 17, 2016.

(51) Int. Cl.
*B23K 1/00* (2006.01)
*F02B 77/11* (2006.01)
(Continued)

(52) U.S. Cl.
CPC ............ *F02B 77/11* (2013.01); *B23K 1/0008* (2013.01); *C23C 4/129* (2016.01);
(Continued)

(58) Field of Classification Search
None
See application file for complete search history.

(56) References Cited

U.S. PATENT DOCUMENTS 6,071,628 A    6/2000  Seals et al.
8,356,482 B2 * 1/2013  Duval .................. C23C 4/18
                                            415/200
(Continued)

FOREIGN PATENT DOCUMENTS

CN    101506569 A    8/2009
JP    S59220350 A   12/1984
(Continued)

OTHER PUBLICATIONS

Kawaguchi, Tateno, Yamashita, Tomoda, Nishikawa, Yamashita, Wakisaka, Nakakita; "Toyota's Innovative Thermal Management Approaches—Thermo Swing Wall Insulation Technology—"; 24th Aachen Colloquium Automobile and Engine Technology 2015; pp. 391-414.

*Primary Examiner* — Daniel J. Schleis
(74) *Attorney, Agent, or Firm* — Quinn IP Law

(57) ABSTRACT

A composite thermal barrier coating (TBC) may be applied to a surface of components within an internal combustion engine. The composite TBC provides low thermal conductivity and low heat capacity insulation that is sealed against combustion gasses. The composite TBC includes three layers, bonded to one another, i.e., a first (bonding) layer, a second (insulating) layer, and a third (sealing) layer. The insulating layer is disposed between the bonding layer and the sealing layer. The bonding layer is bonded to the component and to the insulating layer. The insulating layer includes hollow microspheres that are sintered together to form insulation that provides a low effective thermal conductivity and low effective heat capacity. The sealing layer is a thin film that is configured to resist the high tempera-
(Continued)

tures, present within the engine. The sealing layer is impermeable to gasses and presents a smooth surface.

20 Claims, 4 Drawing Sheets

(51) Int. Cl.
    *C23C 4/129*     (2016.01)
    *C23C 18/16*     (2006.01)
    *C25D 3/12*     (2006.01)
    *C25D 7/00*     (2006.01)
    *C25D 15/00*     (2006.01)
    *F02F 3/10*     (2006.01)

(52) U.S. Cl.
    CPC ............ *C23C 18/1633* (2013.01); *C25D 3/12* (2013.01); *C25D 7/008* (2013.01); *C25D 15/00* (2013.01); *F02F 3/10* (2013.01)

(56) References Cited

U.S. PATENT DOCUMENTS

| | | |
|---|---|---|
| 2003/0077473 A1 | 4/2003 | Bretschneider et al. |
| 2003/0104147 A1 | 6/2003 | Bretschneider et al. |
| 2010/0242477 A1 | 9/2010 | Duval et al. |
| 2013/0146041 A1 | 6/2013 | Hijii et al. |

FOREIGN PATENT DOCUMENTS

| | | |
|---|---|---|
| JP | 2003113737 A | 4/2003 |
| JP | 2009243352 A | 10/2009 |
| WO | 0052307 A1 | 9/2000 |
| WO | 2009020206 A1 | 2/2009 |
| WO | 2013038249 A2 | 3/2013 |
| WO | 2015019145 A2 | 2/2015 |
| WO | 2015073623 A1 | 5/2015 |

* cited by examiner

COMPOSITE THERMAL BARRIER COATING

CROSS REFERENCE TO RELATED APPLICATIONS

This application claims the benefit of and priority to U.S. Provisional Patent Application No. 62/296,354, filed on Feb. 17, 2016, and 62/312,882, filed on Mar. 24, 2016, which are hereby incorporated by reference in their entirety.

TECHNICAL FIELD

The disclosure relates generally to a composite thermal barrier coating.

BACKGROUND

Internal combustion engines include a plurality of cylinders, a plurality of pistons, at least one intake port, and at least one exhaust port. The cylinders each include surfaces that define a combustion chamber. One or more surfaces of the internal combustion engine are coated with thermal barrier coatings to improve the heat transfer characteristics of the internal combustion engine.

SUMMARY

A composite thermal barrier coating (TBC) may be applied to a surface of components within an internal combustion engine. The composite TBC is bonded to the components of the engine to provide low thermal conductivity and low heat capacity insulation that is sealed against combustion gasses.

The composite TBC includes three layers, bonded to one another, i.e., a first (bonding) layer, a second (insulating) layer, and a third (sealing) layer. The insulating layer is disposed between the bonding layer and the sealing layer. The bonding layer is bonded to the component and to the insulating layer.

The insulating layer comprises hollow microspheres that are sintered together to form insulation that provides a low effective thermal conductivity and low effective heat capacity.

The sealing layer is a thin film that is configured to resist the high temperatures, present within the engine. The sealing layer is impermeable to gasses and presents a smooth surface.

The composite TBC has a low thermal conductivity to reduce heat transfer losses and a low heat capacity so that the surface temperature of the composite TBC tracks the gas temperature in the combustion chamber. Thus, the composite TBC allows surface temperatures of the component to swing with the gas temperatures. This reduces heat transfer losses without affecting the engine's breathing capability and without causing knock. Further, heating of cool air entering the cylinder of the engine is reduced. Additionally, exhaust temperature is increased, resulting in faster catalyst light off time and improved catalyst activity.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
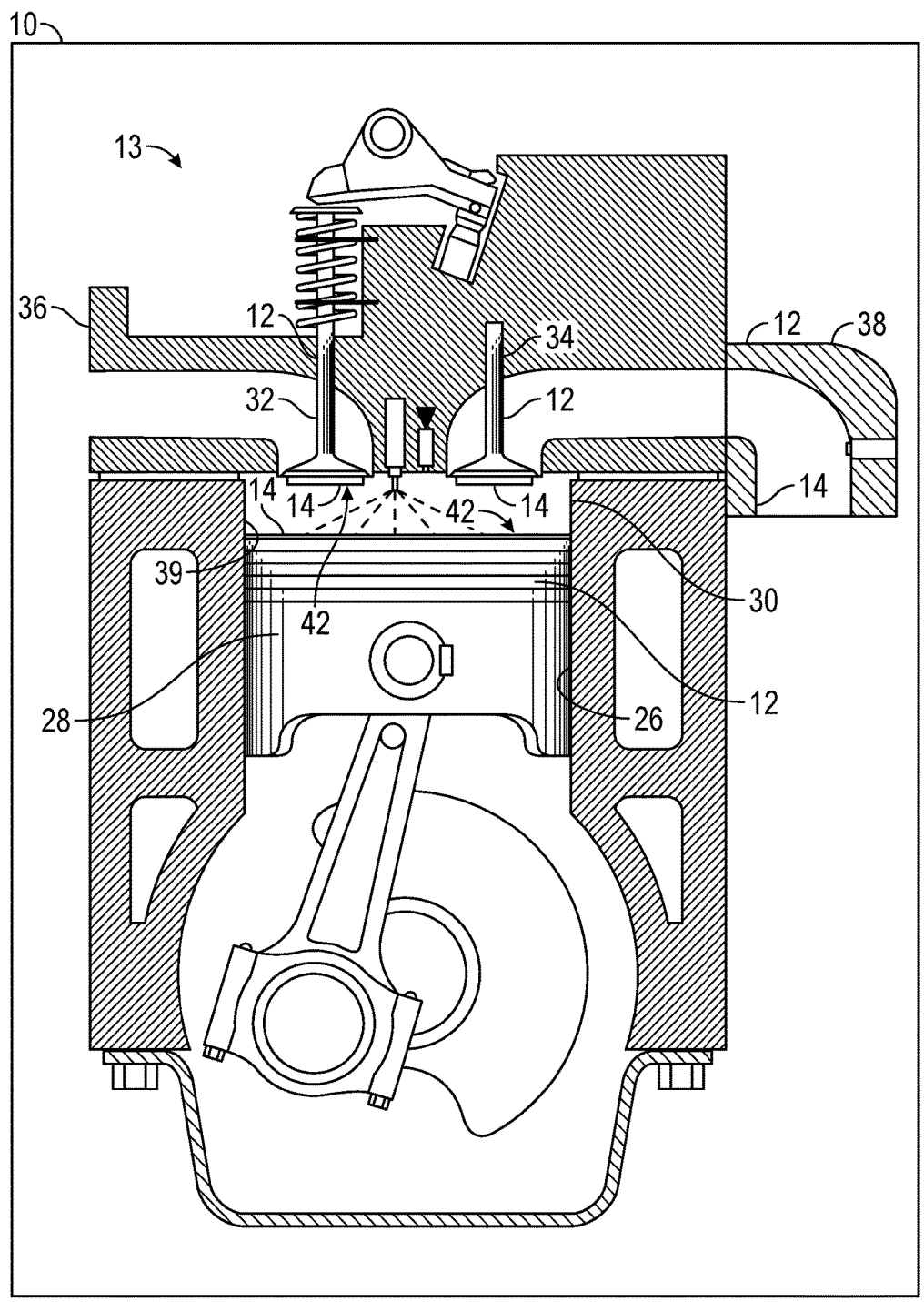
FIG. 1 is a schematic, diagrammatic view of a vehicle illustrating a side view of a single cylinder internal combustion engine having a composite thermal barrier coating disposed on a plurality of components.

Referring to the drawings, wherein like reference numbers refer to like components throughout the views, FIG. 1 shows a portion of an example vehicle 10. The vehicle 10 may include an engine 13 having a component 12. The component 12 has a composite (multi-layer) thermal barrier coating (TBC) 14 of the type disclosed herein, applied thereto.

While the vehicle 10 and the engine 13 of FIG. 1 are a typical example application, suitable for the composite TBC 14 disclosed herein, the present design is not limited to vehicular and/or engine applications. Stationary or mobile, machine or manufacture, in which a component thereof is exposed to heat may benefit from use of the present design. For illustrative consistency, the vehicle 10 and engine 13 will be described hereinafter as an example system, without limiting use of the composite TBC 14 to such an embodiment.

FIG. 1 illustrates an engine 13 defining a single cylinder 26. However, those skilled in the art will recognize that the present disclosure may also be applied to components 12 of engines 13 having multiple cylinders 26. Each cylinder 26 defines a combustion chamber 30. The engine 13 is configured to provide energy for propulsion of the vehicle 10. The engine 13 may include but is not limited to a diesel engine or a gasoline engine.

The engine 13 further includes an intake assembly 36 and an exhaust manifold 38, each in fluid communication with the combustion chamber 30. The engine 13 includes a reciprocating piston 28, slidably movable within the cylinder 26.

The combustion chamber 30 is configured for combusting an air/fuel mixture to provide energy for propulsion of the vehicle 10. Air may enter the combustion chamber 30 of the engine 13 by passing through the intake assembly 36, where airflow from the intake manifold into the combustion chamber 30 is controlled by at least one intake valve 32. Fuel is injected into the combustion chamber 30 to mix with the air, or is inducted through the intake valve(s) 32, which provides an air/fuel mixture. The air/fuel mixture is ignited within the combustion chamber 30. Combustion of the air/fuel mixture creates exhaust gas, which exits the combustion chamber 30 and is drawn into the exhaust manifold 38. More specifically, airflow (exhaust flow) out of the combustion chamber 30 is controlled by at least one exhaust valve 34.

Figure 2:
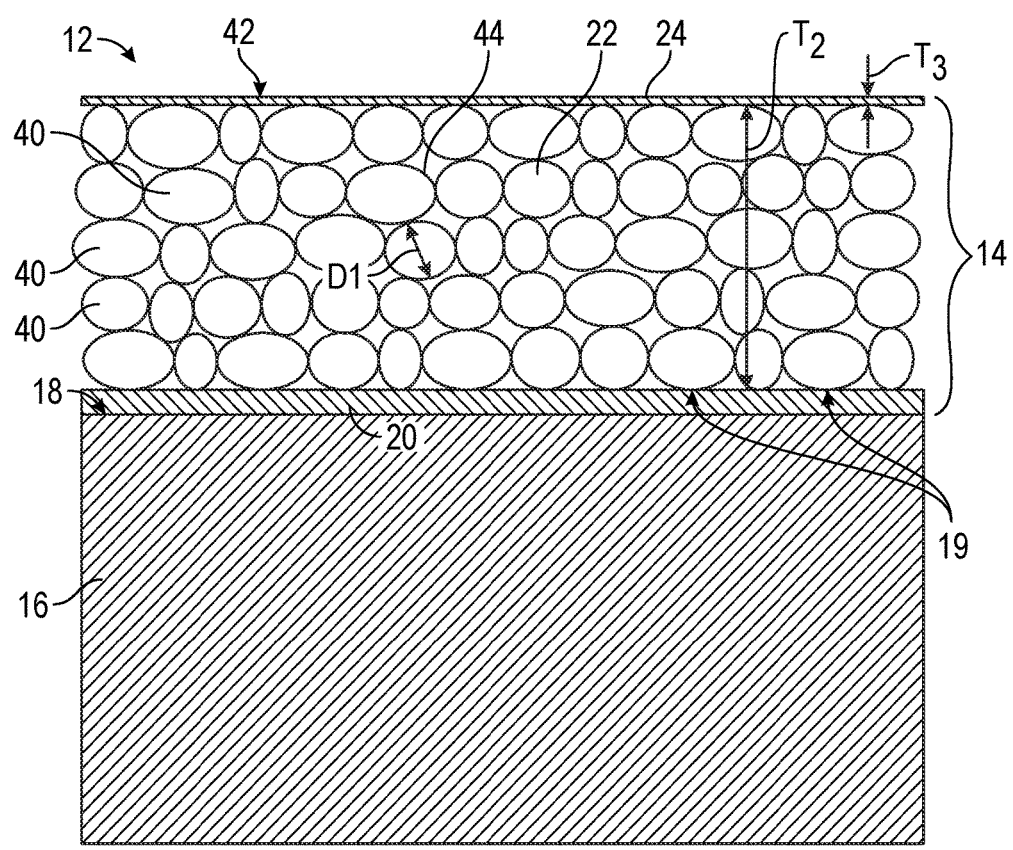
FIG. 2 is a schematic cross-sectional side view of the composite thermal barrier coating disposed on the component.

With reference to FIGS. 1 and 2, the composite TBC 14 may be disposed on a face or surface of one or more of the components 12 of the engine 13, i.e., the piston 28, the intake valve 32, exhaust valve 34, interior walls of the exhaust manifold 38, combustion dome 39, and the like. The composite TBC 14 is bonded to the component 12 to form an insulator configured to reduce heat transfer losses, increase efficiency, and increase exhaust gas temperature during operation of the engine 13. The composite TBC 14 is configured to provide low thermal conductivity and low heat capacity. As such, the low thermal conductivity reduces heat transfer losses and the low heat capacity means that the surface of the composite TBC 14 tracks with the temperature of the gas during temperature swings and heating of cool air entering the cylinder is minimized.

Referring to FIG. 2, each component 12 includes a substrate 16 presenting a surface 18, and the composite TBC 14 is bonded to the surface 18 of the substrate 16. The composite TBC 14 may include three layers, i.e., a first (bonding) layer 20, a second (insulating) layer 22, and a third (sealing) layer 24. However, depending on the material provided, it should be appreciated that in some embodiments, the TBC 14 may not include the first bonding layer 20, because an outer portion of the insulating layer 22 may be configured to bond directly to the substrate 16. For example, when the first bonding layer 20 includes nickel (Ni) and the substrate 16 includes iron (Fe), the first layer 20 may not be required. However, as explained in more detail below, the composite TBC 14 may include more than three layers.

The insulating layer 22 includes a plurality of hollow microspheres 40, sintered together to create a layer having an extremely high porosity. Preferably, the porosity of the insulating layer 22 is at least 80%. More preferably, the porosity of the insulating layer 22 is at least 95%. The high porosity provides for a corresponding volume of air and/or gases to be contained therein, thus providing the desired insulating properties of low effective thermal conductivity and low effective heat capacity. The thickness T2 of the insulating layer 22 is between 100 microns (μm) and 1 millimeter (mm). More preferably, the thickness T2 of the insulating layer 22 is between 100 and 500 μm. Even more preferably, the thickness T2 of the insulating layer 22 is between 100 and 300 μm. The insulating layer 22 is configured to withstand pressures of at least 80 bar. More preferably, the insulating layer 22 is configured to withstand pressures of at least 100 bar. Even more preferably, the insulating layer 22 is configured to withstand pressures of at least 150 bar. Additionally, with respect to temperature, the insulating layer 22 is configured to withstand surface temperatures of at least 300 degrees Celsius (° C.). More preferably, the insulating layer 22 is configured to withstand temperatures of at least 500° C. Even more preferably, the insulating layer 22 is configured to withstand temperatures of at least 1,100° C. The heat capacity of the TBC 14 may be configured to ensure the surface of the substrate 16 does not get above 500° C.

The hollow microspheres 40 may be comprised of hollow polymer, metal, glass, and/or ceramic spheres 45. The hollow spheres 45 are coated with metal, such as nickel or iron alloys. In one non-limiting embodiment, the hollow microspheres 40 are comprised of metal, such as nickel, nickel alloy compounds, and the like. At least one metallic coating layer 44 may be disposed on an exterior surface of each sphere 45. The metallic coating layer 44 may include nickel (Ni). The metallic coating layer 44 may be disposed on the exterior surface of the microspheres 40 via electroplating, flame spraying, painting, electroless plating, vapor deposition, and the like. It should be appreciated that during the bonding or sintering of the metallic coated microspheres, the hollow spheres 45 that are comprised of polymer, metal, and glass having a melting temperature that is less than that of the metallic coating layer 44, the hollow microspheres 45 may melt or otherwise disintegrate to become part of the metallic coating layer 44 itself, or melt and turn into a lump of material within the hollow microsphere 40. However, when the melting temperature of the hollow sphere 45 is higher than the melting temperature of the material of the metallic coating layer 44, such as when the hollow sphere 45 is formed from a ceramic material, the hollow sphere 45 remains intact and does not disintegrate or become absorbed. The metallic coating layer 44 may include nickel, iron, and the like. The hollow microspheres 40 may have a diameter D1 of between 5 and 100 μm. More preferably, the microspheres 40 may have a diameter D1 of between 20 and 100 μm. Even more preferably, the microspheres 40 may have a diameter D1 of between 20-40 μm. It should be appreciated that the microspheres do not necessarily have the same diameter, as a mixture of diameters may be configured to provide a desired open porosity, i.e., packing density, to provide a desired amount of strength to the insulating layer. A plurality of the hollow microspheres 40 may be molded or sintered at a sintering temperature, under pressure, for a molding time, until bonds are formed between the coating layers 44 of adjacent hollow microspheres 40 form the insulating layer 22. The sintering temperature may approach the melting temperature of the metallic coating layer 44. However, in the case where the hollow spheres 45 are comprised of ceramic material, the sintering temperature will not be below the melting temperature of the metal coated spheres 45.

Figure 4:
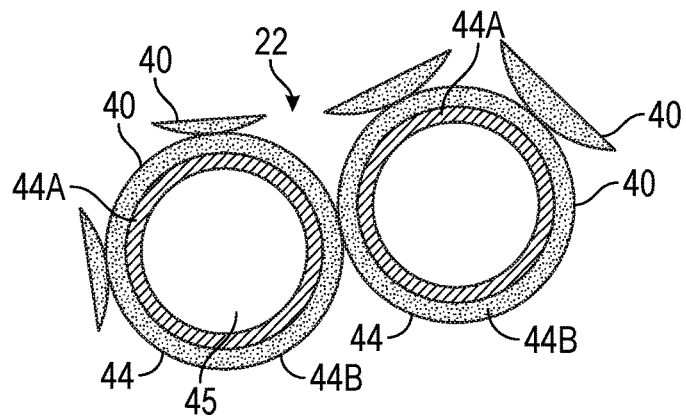
FIG. 4 is a schematic cross-sectional side view of a section of hollow microspheres, each having a first and second metallic coating layer.
Figure 5:
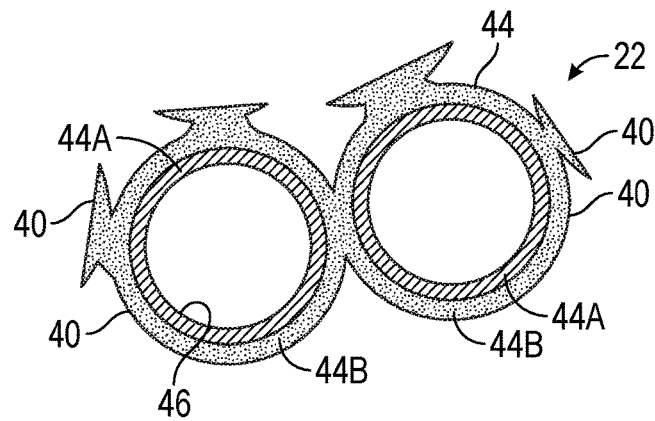
FIG. 5 is a schematic cross-sectional side view of the section of hollow microspheres of FIG. 4, with the second metallic coating layers sintered together.
Figure 6:
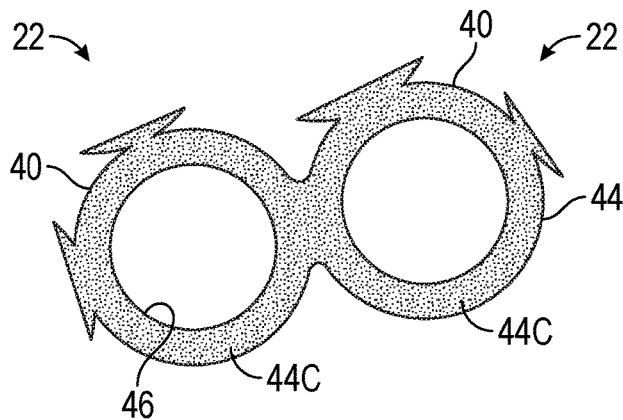
FIG. 6 is a schematic cross-sectional side view of the section of hollow microspheres of FIG. 5, with the first and second metallic coating layers diffusion bonded together to form a metallic alloy.

In another embodiment, shown in FIGS. 4-6, the insulating layer 22 may be formed from hollow microspheres 40 that initially include two metallic coating layers 44A, 44B. Referring first to FIG. 4, the hollow microspheres 40 initially include a first (inner) metallic coating layer 44A, coated by a second (outer) metallic coating layer 44B. The inner metallic coating layer 44A comprises nickel (Ni), which is then coated with the outer metallic coating layer 44B that comprises copper (Cu or Cu—Zn). The outer metallic coating 44B of Cu or Cu—Zn is applied to the inner metallic coating layer 44A via electroplating, flame spraying, painting, electroless plating, vapor deposition, and the like, to form the outer metallic coating layer 44B. A thickness of the outer metallic coating layer 44B should be thinner than a thickness of the inner metallic coating layer 44A. Further, a weight of the metallic (i.e., Cu or Cu—Zn) material of the outer metallic coating layer 44B may not be much greater than a weight of the metallic (i.e., Ni) of the inner metallic coating layer 44A. As such, the weight of the Cu material of the second metallic coating layer 44B is not much greater than the weight of the Ni of the inner metallic coating layer 44A. Preferably, the weight of the Cu material of the outer metallic coating layer 44B is less than the weight of the inner metallic coating layer 44A for a maximum temperature. It is important to maintain a low quantity of Cu, since too much Cu will lower the melting temperature of the resultant alloy material.

Figure 3:
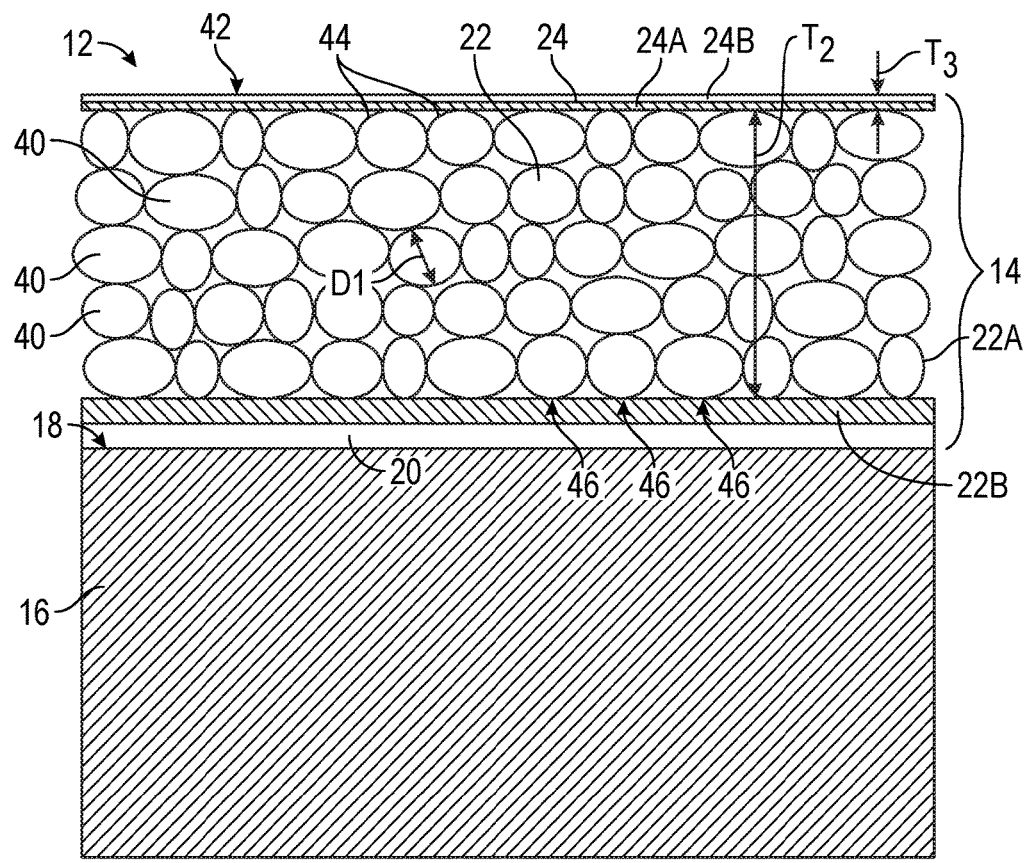
FIG. 3 is a schematic cross-sectional side view of another embodiment of the composite thermal barrier coating disposed on the component.

With reference to FIGS. 2 and 3, the coated microspheres 40 are arranged in a desired layer, having a desired thickness T2. Referring to FIG. 5, the microspheres 40 are heated to a temperature approximately equal to or above a melting temperature of the outer metallic coating layer 44B. As such, the temperature is sufficient to cause brazing or melting of the second coating layer. Next, referring to FIG. 6, the temperature is decreased to below the solidus. The temperature is maintained below the solidus for a period of time, but at a sufficient temperature, such that diffusion occurs between the copper (Cu or Cu—Zn) of the outer metallic coating layer 44B and the nickel (Ni) of the first metallic coating layer 44A. As such, solid state diffusion occurs between the respective inner and outer metallic coating layers 44A, 44B to form an alloy metallic coating layer 44C. Thus, the resultant insulating layer 22 includes a nickel-copper (Ni—Cu or Ni—Cu—Zn) alloy layer 44C surrounding the hollow microspheres 40. The amount of diffusion that occurs between the inner and outer metallic coating layers 44A, 44B is a function of the temperature and time applied to the microspheres 40. Additionally, the diffusion bonding may be done at increased pressure in order to equalize a pressure within each of the microspheres and atmosphere.

Additionally, when the hollow microspheres 40 are formed from ceramic, and are heated to promote bonding between the adjacent microspheres 40, the spheres 45, upon which the inner metallic coating layer 44A is deposited, may melt. In instances where the hollow spheres 45 are formed from polymer, metal, and glass, the hollow sphere 45 may melt as a function of a material properties of the hollow sphere 45, and a sintering temperature applied to the microspheres 40. Therefore, when melting of the hollow spheres 45 occurs, the inner metallic coating layer 44A is no longer a "coating", but rather becomes an inner wall 46 of the microsphere 40.

With reference to FIG. 2, the bonding layer 20 is configured to bond to the surface 18 of the substrate 16 and to the insulating layer 22, such that the insulating layer 22 is attached to the substrate 16. In one non-limiting embodiment, the bonding layer 20 is configured to diffuse into the surface 18 of the substrate 16 and into the insulating layer 22 to form bonds there between. In one non-limiting embodiment, the substrate 16 comprises aluminum, the insulating layer 22 comprises nickel coated microspheres 40, and the bonding layer 20 comprises brass, i.e., a copper-zinc (Cu—ZN) alloy material. The Cu—Zn content is determined to create optimum bonding strength, optimum thermal expansion characteristics, heat treatment processes, fatigue resistance, and the like. The copper and zinc have good solid solubility in aluminum, nickel, and iron, while iron and nickel have very low solid solubility in aluminum. Thus, a bonding layer 20 having copper and zinc combinations provides an intermediate structural layer that promotes diffusion bonding between the adjacent aluminum substrate 16 and the adjacent nickel or iron insulating layer 22. It should be appreciated, however, that the substrate 16, insulating layer 22, and bonding layer 20 are not limited to aluminum, nickel, and brass, but may comprise other materials.

One side of the bonding layer 20 may be disposed across the surface 18 of the substrate 16, such that the bonding layer 20 is disposed between the substrate 16 and the insulating layer 22. A compressive force may be applied to the insulating layer 22 and the substrate 16, at a bonding temperature, for at least a minimum apply time. The melting temperature of the material of the bonding layer 20 is less than the melting temperature of each of the substrate 16 and the material of the insulating layer 22. In another embodiment, the melting temperature of the material of the bonding layer 20 is between the melting temperature of each of the substrate 16 and the material of the insulating layer 22. Further, the required bonding temperature may be less than the melting temperature of the material of the substrate 16 and the material of the insulating layer 22, but sufficiently high enough to encourage diffusion bonding to occur between the metallic material of the substrate 16 and the metallic material of the bonding layer 20 and between the metallic material of the substrate 16 and the metallic material of the insulating layer 22.

With reference to FIG. 2, it should be appreciated that the bonding layer 20 may be bonded to an inner surface of the insulating layer 22 prior to bonding the bonding layer 20 to the surface 18 of the substrate 16.

Additionally, the bonding layer 20 is not limited to being bonded to the surface 18 of the substrate 16 and/or the insulating layer 22 with solid-state diffusion, as other methods of adhesion may also be used, such as by wetting, brazing, and combinations thereof.

Referring now to FIG. 3, the insulating layer 22 may include more than one layer. More specifically, the insulating layer 22 may include a microstructure layer 22A and a transition layer 22B. The microstructure layer 22A is a layer comprising the plurality of hollow microspheres 40, bonded together, as described above. The transition layer 22B may comprise nickel or iron. More specifically, the metallic material of the transition layer 22B and the coating for the microspheres 40 of the microstructure layer 22A are identical to promote bonding between the layers 22A, 22B. As such, the microspheres 40 on a periphery of the microstructure layer 22A are bonded to the transition layer 22B when the microstructure layer 22A and the transition layer 22B are heated to a temperature sufficient to sinter the microsphere layer (i.e., the insulating layer 22) to the transition layer 22B of the metallic material (i.e., nickel, iron, and the like). The microstructure layer 22A is formed to have a thickness T2 of between 100 μm and 1 mm. More preferably, the thickness T2 of the microstructure layer 22A is between 100 and 500 μm. Even more preferably, the thickness T2 of the microstructure layer 22A is between 100 and 300 μm. The microstructure layer 22A is configured to withstand pressures of at least 150 bar and withstand surface temperatures of at least 1,100° C.

The transition layer 22B bonds to the coating 44 of the individual microspheres 40 at points of contact 46. The transition layer 22B provides a supporting structure or backbone for the microsphere layer 22A, thus giving the insulating layer 22 strength and rigidity. As such, the strength and rigidity of the insulating layer 22 is a function of a thickness of the transition layer 22B. Additionally, the transition layer 22B is bonded to the bonding layer 20, opposite the microstructure layer 22A, such that the bonding layer 20 is disposed between the substrate 16 and the transition layer 22B of the insulating layer 22. As such, the transition layer 22B is disposed in facing contact relationship with the bonding layer 20. Upon the application of heat to the transition layer and the bonding layer, for a sufficient amount of time, metal diffusion occurs between the bonding layer 20 and the substrate 16 and between the bonding layer 20 and the transition layer 22B of the insulating layer 22. The transition layer 22B provides greater surface area contact to the bonding layer 20 for promoting a larger area of diffusion bonding, than when the transition layer 22B is not used, and the microspheres 40 of the microstructure layer 22A diffusion bond directly to the bonding layer 20 (as shown in FIG. 2).

It should be appreciated that a desired number of bonding layers 20 may be applied, providing the desired characteristics, so long as the bonding layer 20 bonds to the insulating layer 22 and to the substrate 16.

Referring again to FIG. 2, the sealing layer 24 is disposed over the insulating layer 22, such that the insulating layer 22 is disposed between the sealing layer 24 and the bonding layer 20. The sealing layer 24 is a high temperature, thin film. More specifically, the sealing layer 24 comprises material that is configured to withstand temperatures of at least 1,100° C. The sealing layer 24 is configured to be thin, i.e., a thickness T3 not greater than 20 µm. More preferably, the sealing layer 24 is configured to have a thickness T3 of not greater than 5 µm. The sealing layer 24 is non-permeable to combustion gases, such that a seal is provided between the sealing layer 24 and the insulating layer 22. Such a seal prevents debris from combustion gases, such as unburned hydrocarbons, soot, partially reacted fuel, liquid fuel, and the like, from entering the porous structure defined by the hollow microspheres 40. If such debris were allowed to enter the porous structure, air disposed in the porous structure would end up being displaced by the debris, and the insulating properties of the insulating layer 22 would be reduced or eliminated.

The sealing layer 24 may be configured to present an outer surface 42 that is smooth. Having a smooth sealing layer 24 may be important to prevent the creation of turbulent airflow as the air flows across the outer surface 42 of the sealing layer 24. Further, having a sealing layer 24 with a smooth surface will prevent an increased heat transfer coefficient. In one non-limiting example, the sealing layer 24 may be applied to the insulating layer 22 via electroplating or vapor deposition. In another non-limiting example, the sealing layer 24 may be applied to the insulating layer 22 simultaneously with sintering the insulating layer 22.

The sealing layer 24 is configured to be sufficiently resilient so as to resist fracturing or cracking during exposure to combustion gases, thermal fatigue, or debris. Further, the sealing layer 24 is configured to be sufficiently resilient so as to withstand expansion and/or contraction of the underlying insulating layer 22.

Referring again to FIG. 3, the sealing layer 24 may include more than one layer. More specifically, the sealing layer 24 may include a first barrier layer 24A and a second barrier layer 24B. The first barrier layer 24A may be disposed on the insulating layer 22, and the second barrier layer 22B may be disposed on the first barrier layer 24A, such that the first barrier layer 24A is disposed between the second barrier layer 24B and the insulating layer 22. The second barrier layer 24B may be configured to present the outer surface 42 that is smooth. The first barrier layer 24A and the second barrier layer 24B may be layered upon one another to provide desired properties, e.g., super-high temperature resistance, corrosion resistance. In one non-limiting example, the second barrier layer 24B provides corrosion resistance and super-high temperature resistance, while the first barrier layer 24A provides a seal against the underlying insulating layer 22 to prevent debris from entering open spaces defined between microspheres 40 of the underlying insulating layer 22. It should be appreciated that a desired number of sealing layers 24 may be applied, providing the desired characteristics, so long as the sealing layer 24 seals against the underlying insulating layer 22 to prevent debris or gases from entering the open spaces defined between the microspheres 40. Additionally, a thickness T3 of the sealing layer 24, regardless of the number of component barrier layers, is preferably not greater than 20 µm. More preferably, the thickness T3 of the sealing layer 24 is configured to have a thickness T3 of not greater than 5 µm.

Further, the bonding, insulating, and sealing layers 20, 22, 24 are each configured to have compatible coefficient of thermal expansion characteristics to withstand thermal fatigue.

It should be appreciated that the composite TBC 14 may be applied to components other than present within an internal combustion engine. More specifically, the composite TBC 14 may be applied to components of spacecrafts, rockets, injection molds, and the like.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A composite thermal barrier coating comprising:
   a first layer configured to be bonded to a substrate;
   a second layer bonded to the first layer;
   wherein the second layer comprises a plurality of hollow microspheres, bonded together to define a porous structure; and
   a third layer bonded to the second layer;
   wherein the third layer is non-permeable to combustion gases such that the third layer seals against the second layer.

2. The composite thermal barrier coating, as set forth in claim 1, wherein the first layer is configured to be bonded to a substrate comprising metal; and
   wherein each of the plurality of hollow microspheres include a metallic coating, such that adjacent microspheres of the plurality of hollow microspheres are bonded together at the respective coatings.

3. The composite thermal barrier coating, as set forth in claim 2, wherein the second layer includes a microstructure layer and a transition layer;
   wherein the transition layer is diffusion bonded to the first layer and the transition layer is bonded to the microstructure layer.

4. The composite thermal barrier coating, as set forth in claim 3, wherein the first layer comprises at least one of a copper based material, a zinc based material, and an alloy comprising copper and zinc;
   wherein the coating of each of the plurality of hollow microspheres comprises at least one of a nickel based material and an iron based material; and
   wherein the transition layer comprises at least one of a nickel based material and an iron based material, such that the transition layer is diffusion bonded to the first layer and the transition layer is sintered to the coating of the adjacent hollow microspheres of the plurality of microspheres.

5. The composite thermal barrier coating, as set forth in claim 2, wherein the coating comprises at least one of a nickel based material, a copper based material, and an alloy comprising copper and nickel.

6. The composite thermal barrier coating, as set forth in claim 1, wherein the second layer has a porosity of at least 80%.

7. The composite thermal barrier coating, as set forth in claim 6, wherein the second layer has a porosity of at least 95%.

8. The composite thermal barrier coating, as set forth in claim 1, wherein the second layer has a thickness of between 100 microns and 1 millimeter.

9. The composite thermal barrier coating, as set forth in claim 8, wherein the second layer has a thickness of between 100 and 500 microns.

10. The composite thermal barrier coating, as set forth in claim 9, wherein the second layer has a thickness of between 100 and 300 microns.

11. The composite thermal barrier coating, as set forth in claim 1, wherein a coefficient of thermal expansion characteristic of each of the first layer, the second layer, and the third layer is compatible to withstand thermal fatigue.

12. The composite thermal barrier coating, as set forth in claim 1, wherein a thickness of the third layer is not greater than 20 microns.

13. The composite thermal barrier coating, as set forth in claim 12, wherein a thickness of the third layer is not greater than 5 microns.

14. The composite thermal barrier coating, as set forth in claim 13, wherein the third layer includes a first barrier layer and a second barrier layer;
wherein the first barrier layer is bonded to the second layer and the second barrier layer is bonded to the first barrier layer, such that the first barrier layer is disposed between the second barrier layer and the second layer.

15. The composite thermal barrier coating, as set forth in claim 1, wherein the second and third layers are configured to withstand pressures as high as 150 bar and configured to withstand a surface temperature as high as 1,100 degrees Celsius.

16. The composite thermal barrier coating, as set forth in claim 1, wherein each of the plurality of microspheres has a diameter of not greater than 100 μm.

17. The composite thermal barrier coating, as set forth in claim 16, wherein each of the plurality of microspheres has a diameter of between 20 and 100 μm.

18. The composite thermal barrier coating, as set forth in claim 17, wherein each of the plurality of microspheres has a diameter of between 20 and 40 μm.

19. A component comprising:
a substrate presenting a surface; and
a composite thermal barrier coating including:
    a first layer bonded to the surface of the substrate;
    a second layer bonded to the first layer;
    wherein the second layer comprises a plurality of hollow microspheres defining a porous structure; and
    a third layer bonded to the second layer;
    wherein the third layer is non-permeable to combustion gases such that the third layer seals against the second layer.

20. An internal combustion engine comprising:
a component configured to be subjected to combustion gasses, the component including:
    a substrate presenting a surface; and
    a composite thermal barrier coating including:
        a first layer bonded to the surface of the substrate;
        a second layer bonded to the first layer;
        wherein the second layer comprises a plurality of hollow microspheres defining a porous structure; and
        a third layer bonded to the second layer;
        wherein the third layer is non-permeable to combustion gases such that the third layer seals against the second layer.

\* \* \* \* \*